US011575810B2

(12) United States Patent
Roth et al.

(10) Patent No.: US 11,575,810 B2
(45) Date of Patent: Feb. 7, 2023

(54) AUTO-POSITIONING CAMERA FOR DRAWN IMPLEMENTS

(71) Applicant: Deere & Company, Moline, IL (US)

(72) Inventors: Darin L. Roth, Batavia, IA (US); Joshua D. Graeve, Ottumwa, IA (US); Cole L. Murray, Polk City, IA (US)

(73) Assignee: Deere & Company, Moline, IL (US)

( * ) Notice: Subject to any disclaimer, the term of this patent is extended or adjusted under 35 U.S.C. 154(b) by 247 days.

(21) Appl. No.: 17/015,672

(22) Filed: Sep. 9, 2020

(65) Prior Publication Data
US 2022/0078314 A1 Mar. 10, 2022

(51) Int. Cl.
*H04N 5/225* (2006.01)
*H04N 5/232* (2006.01)
(Continued)

(52) U.S. Cl.
CPC ......... *H04N 5/2253* (2013.01); *A01B 59/002* (2013.01); *A01B 59/042* (2013.01); *A01B 76/00* (2013.01); *A01D 34/00* (2013.01); *A01D 34/001* (2013.01); *A01D 75/00* (2013.01); *A01F 15/08* (2013.01); *A01F 15/101* (2013.01); *F16H 1/06* (2013.01); *F16M 13/022* (2013.01); *H04N 5/23203* (2013.01); *H04N 5/23216* (2013.01); *H04N 5/23299* (2018.08); *A01F 2015/103* (2013.01)

(58) Field of Classification Search
CPC ........... H04N 5/23203; H04N 5/23216; H04N 5/2253; H04N 5/23299; F16H 1/06; A01B 59/042; A01B 59/002; A01B 76/00; A01B 71/02; A01B 69/001; A01F 15/101; A01F 15/08; A01F 2015/103; A01D 34/001; A01D 34/00; A01D 75/00; F16M 13/022
USPC .......................................................... 56/102
See application file for complete search history.

(56) References Cited

U.S. PATENT DOCUMENTS 2,739,438 A 3/1956 McClellan
2,871,780 A 2/1959 Skromme
(Continued)

FOREIGN PATENT DOCUMENTS

EP 0048138 B1 12/1984
JP 2017108653 A 6/2017

OTHER PUBLICATIONS

Extended European Search Report and Written Opinion issued in European Patent Application No. 21192826.2, dated Feb. 14, 2022, in 09 pages.
(Continued)

*Primary Examiner* — Pritham D Prabhakher
(74) *Attorney, Agent, or Firm* — Lucian Wayne Beavers; Patterson Intellectual Property Law, PC (57) ABSTRACT

A drawn agricultural implement includes a main frame and a plurality of ground engaging units supporting the main frame from a ground surface. A working unit is supported from the main frame and configured to engage crops as the implement moves in a forward direction across the ground surface. A draft tongue extends from the main frame for attachment to a tractor. A camera having a field of view is mounted on at least one of the draft tongue, the main frame and the working unit. The camera is movable relative to the at least one of the draft tongue, the main frame and the working unit to reposition the field of view.

15 Claims, 9 Drawing Sheets

(51) Int. Cl.
*A01B 59/00* (2006.01)
*A01B 59/042* (2006.01)
*A01B 76/00* (2006.01)
*A01D 34/00* (2006.01)
*A01D 75/00* (2006.01)
*A01F 15/08* (2006.01)
*A01F 15/10* (2006.01)
*F16H 1/06* (2006.01)
*F16M 13/02* (2006.01)

(56) References Cited

U.S. PATENT DOCUMENTS

| | | | |
|---|---|---|---|
| 4,365,268 A | 12/1982 | Allen et al. | |
| 4,453,460 A | 6/1984 | Rabe et al. | |
| 6,095,254 A | 8/2000 | Homburg | |
| 6,616,167 B2 | 9/2003 | Guiet | |
| 7,047,714 B1* | 5/2006 | Stephenson | A01D 34/64 |
| | | | 56/15.2 |
| 7,400,957 B2 | 7/2008 | Hofer et al. | |
| 7,404,355 B2 | 7/2008 | Viaud et al. | |
| 8,155,870 B2* | 4/2012 | Madsen | A01B 69/001 |
| | | | 701/523 |
| 9,970,180 B2* | 5/2018 | Enix | E01C 19/004 |
| 10,582,185 B2* | 3/2020 | Jensen | A01B 69/001 |
| 10,753,066 B2* | 8/2020 | Ono | E02F 9/262 |
| 2005/0270778 A1* | 12/2005 | Hicok | E02F 9/0858 |
| | | | 362/253 |
| 2007/0050117 A1* | 3/2007 | Kitzler | A01B 69/008 |
| | | | 701/41 |
| 2012/0072068 A1* | 3/2012 | Madsen | A01F 15/0833 |
| | | | 701/28 |
| 2012/0236142 A1* | 9/2012 | Enix | E02F 9/2045 |
| | | | 348/148 |
| 2014/0088824 A1* | 3/2014 | Ishimoto | G06V 20/56 |
| | | | 348/148 |
| 2015/0354943 A1* | 12/2015 | Posselius | G01B 11/026 |
| | | | 73/1.79 |
| 2017/0120800 A1* | 5/2017 | Liñan | B60Q 1/18 |
| 2017/0150018 A1* | 5/2017 | Luoma | F16M 11/046 |
| 2018/0215216 A1 | 8/2018 | Faust et al. | |
| 2018/0260675 A1* | 9/2018 | Hamilton | G06Q 50/02 |
| 2018/0279539 A1 | 10/2018 | Wägner | |
| 2018/0376128 A1* | 12/2018 | Jensen | H04N 13/289 |
| 2020/0205335 A1* | 7/2020 | Sakuma | A01B 63/111 |
| 2020/0205336 A1 | 7/2020 | Boone et al. | |
| 2020/0262056 A1* | 8/2020 | Riegger | F16H 21/44 |
| 2021/0000006 A1* | 1/2021 | Ellaboudy | G06V 10/60 |
| 2021/0144900 A1* | 5/2021 | Henry | A01B 39/04 |
| 2021/0153418 A1* | 5/2021 | Lupu | A01B 63/28 |
| 2021/0201531 A1* | 7/2021 | Creaby | G06T 7/80 |
| 2021/0255639 A1* | 8/2021 | Davis | G05D 1/0278 |

OTHER PUBLICATIONS

Wright, "A Spherical-magnet End-effector for Robotic Magnetic Manipulation", 2015 IEEE International Conference on Robotics and Automation (2015) (6 pages).

* cited by examiner

AUTO-POSITIONING CAMERA FOR DRAWN IMPLEMENTS

FIELD OF THE DISCLOSURE

The present disclosure relates to a camera mounting system for use on drawn implements.

BACKGROUND

Systems for automated control of agricultural equipment depend upon cameras or other sensor systems to visualize the work being done. These sensor systems are typically mounted on the tractor or other towing vehicle, where the human operator and/or automated controller is located. Such systems may not be optimal for many types of working implements used with the tractor.

There is a need for improvements in sensor systems which are designed for the specific implements being used.

SUMMARY OF THE DISCLOSURE

In one embodiment a drawn agricultural implement includes a main frame and a plurality of ground engaging units supporting the main frame from a ground surface. A working unit is supported from the main frame and configured to engage crops as the implement moves in a forward direction across the ground surface. A draft tongue extends from the main frame for attachment to a tractor. At least one sensor is supported from at least one of the draft tongue, the main frame and the working unit. The sensor may be movable relative to the at least one of the draft tongue, the main frame and the working unit to reposition the field of view.

Numerous objects, features and advantages of the present invention will be readily apparent to those skilled in the art upon a review of following description in conjunction with the accompanying drawings.

DETAILED DESCRIPTION

Figure 1:
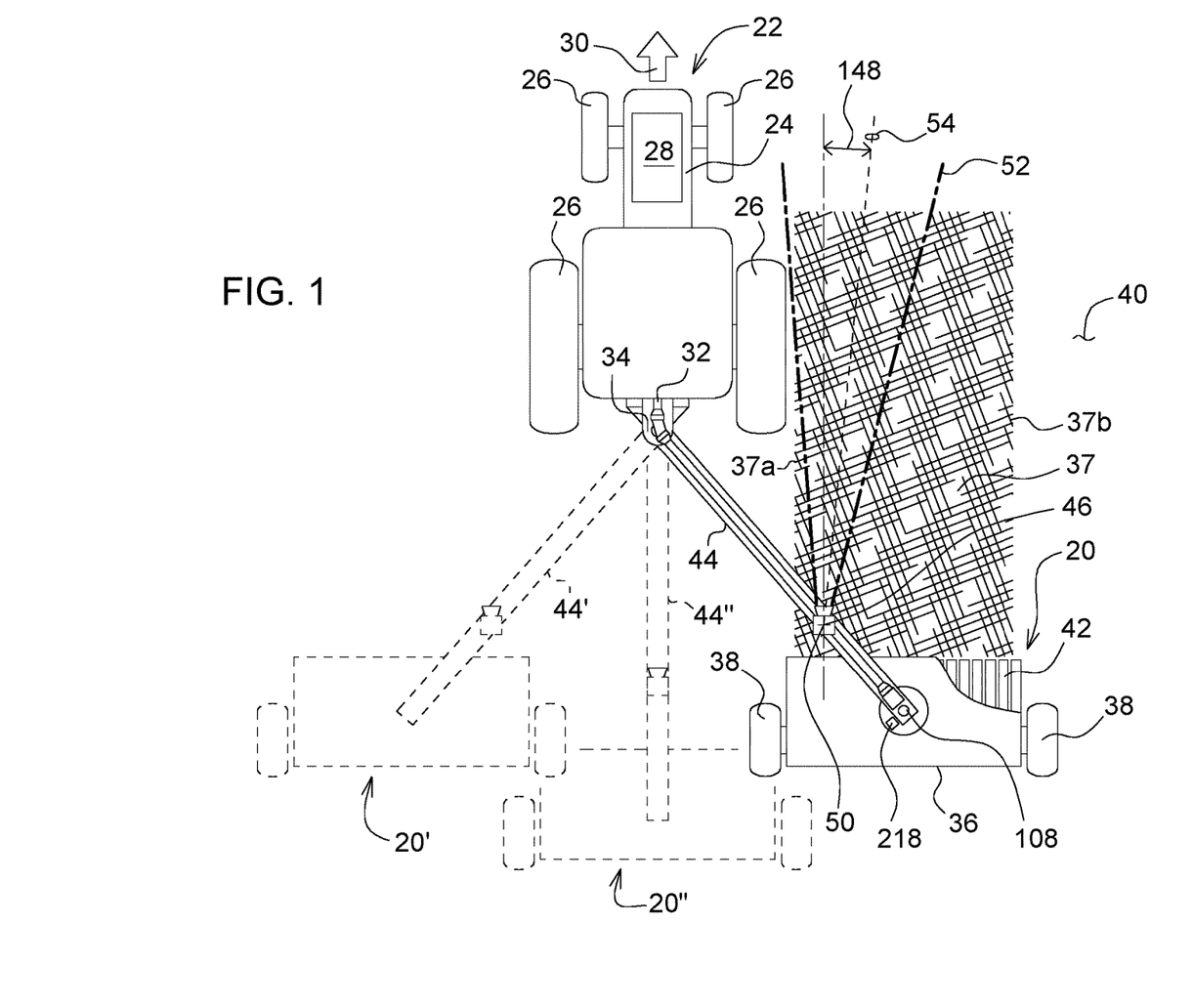
FIG. 1 is a schematic plan view of a tractor pulling a drawn implement, in this case a center pivot mower conditioner. A camera is mounted on the draft tongue and is adjustable so that it is primarily forward facing for both left and right side orientation of the mower conditioner.

Referring now to the drawings and particularly to FIG. 1, a drawn implement 20 is schematically shown being towed by a tractor 22.

The tractor 22 includes a tractor frame 24 carried on a plurality of wheels or other ground engaging units 26. An engine 28 drives the ground engaging units 26 to move the tractor in a forward direction 30. The forward direction 30 may also be referred to as the heading of the tractor 22. Engine 28 also provides power to a power take off 32 located at a rear of the tractor 22. A draw bar or other hitch 34 is located at the rear of the tractor 22.

The drawn implement 20 may generally be described as including a main frame 36 and a plurality of ground engaging units 38 for supporting the main frame 36 from the ground surface 40. Drawn implement 20 further includes a working unit 42 supported from the main frame 36 and configured to engage crops 37 as the implement 20 moves in the forward direction 30 across the ground surface 40. Implement 20 further includes a draft tongue 44 extending from the main frame 36 for attachment to the tractor 22.

Figure 2:
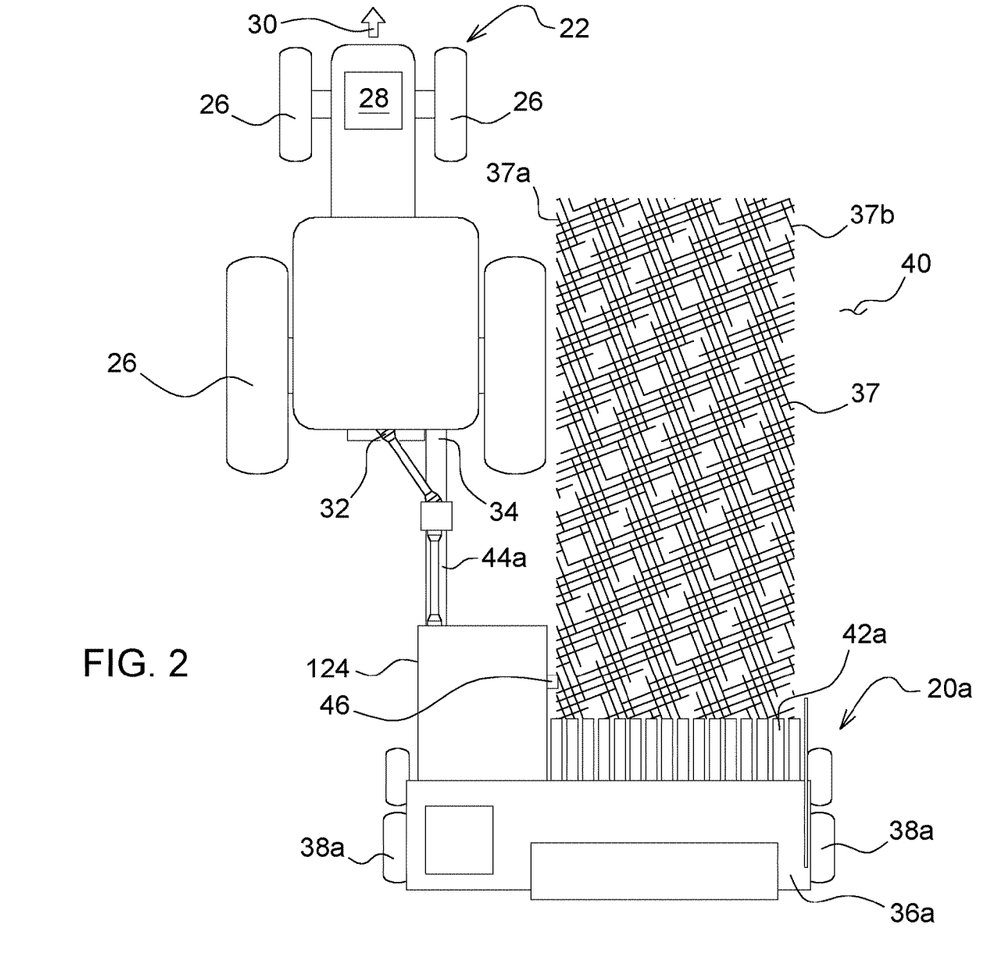
FIG. 2 is a schematic plan view of a tractor pulling a drawn implement, in this case a side-drawn baler. A camera is mounted on the bale case of the baler and is adjustable so that the camera is primarily forward facing.
Figure 3:
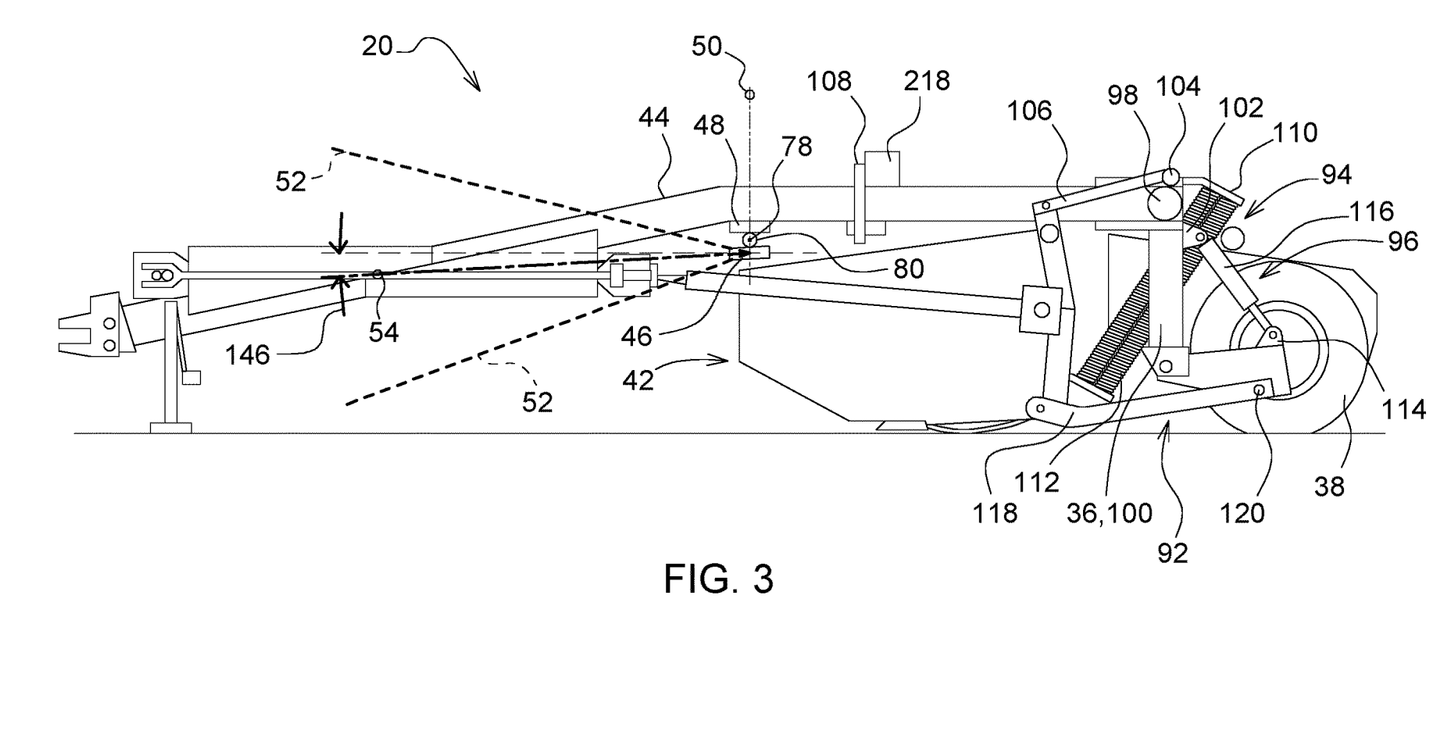
FIG. 3 is a side elevation view of the center pivot mower conditioner of FIG. 1.
Figure 4:
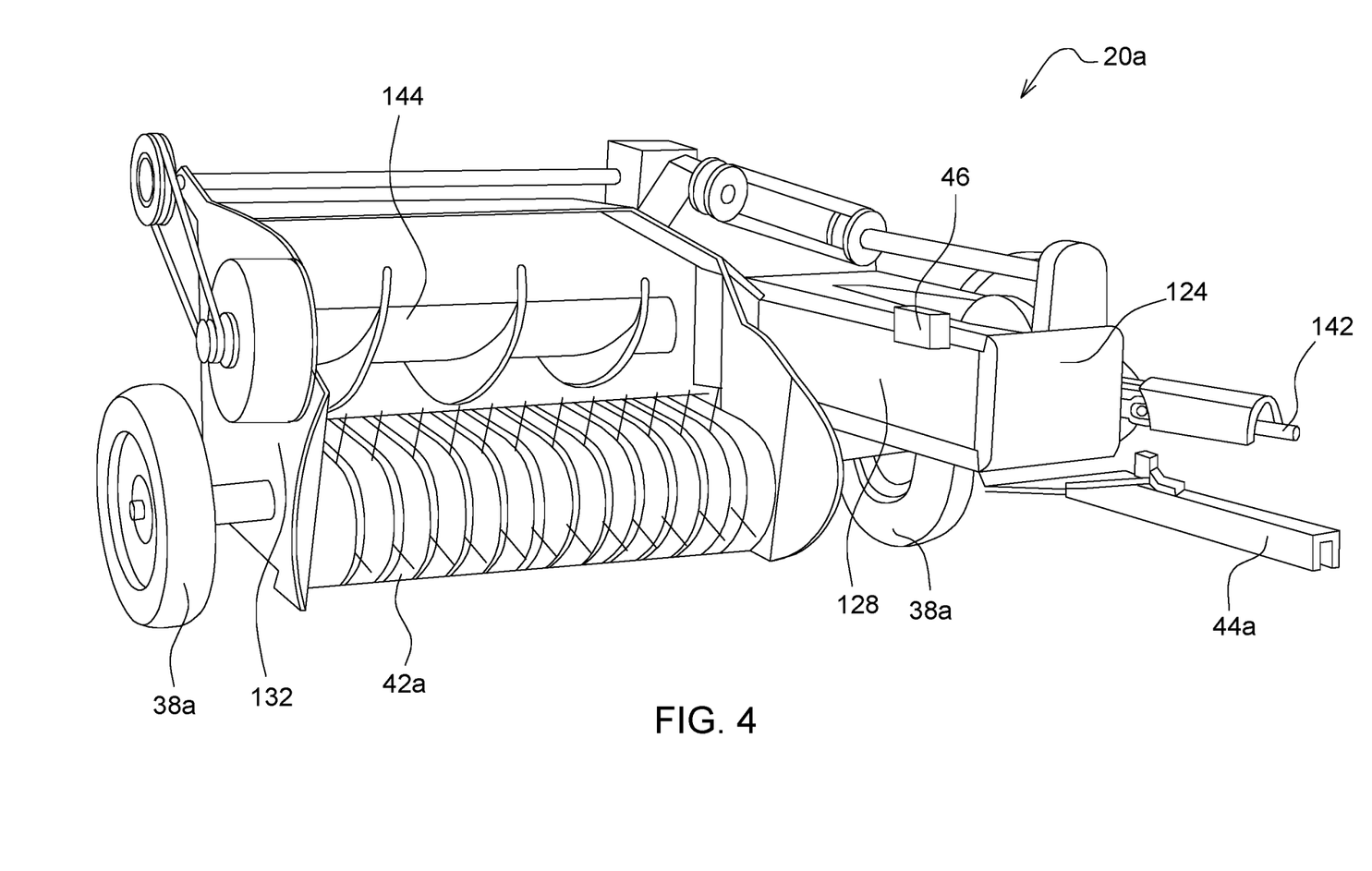
FIG. 4 is a front perspective view of the baler of FIG. 2.
Figure 5:
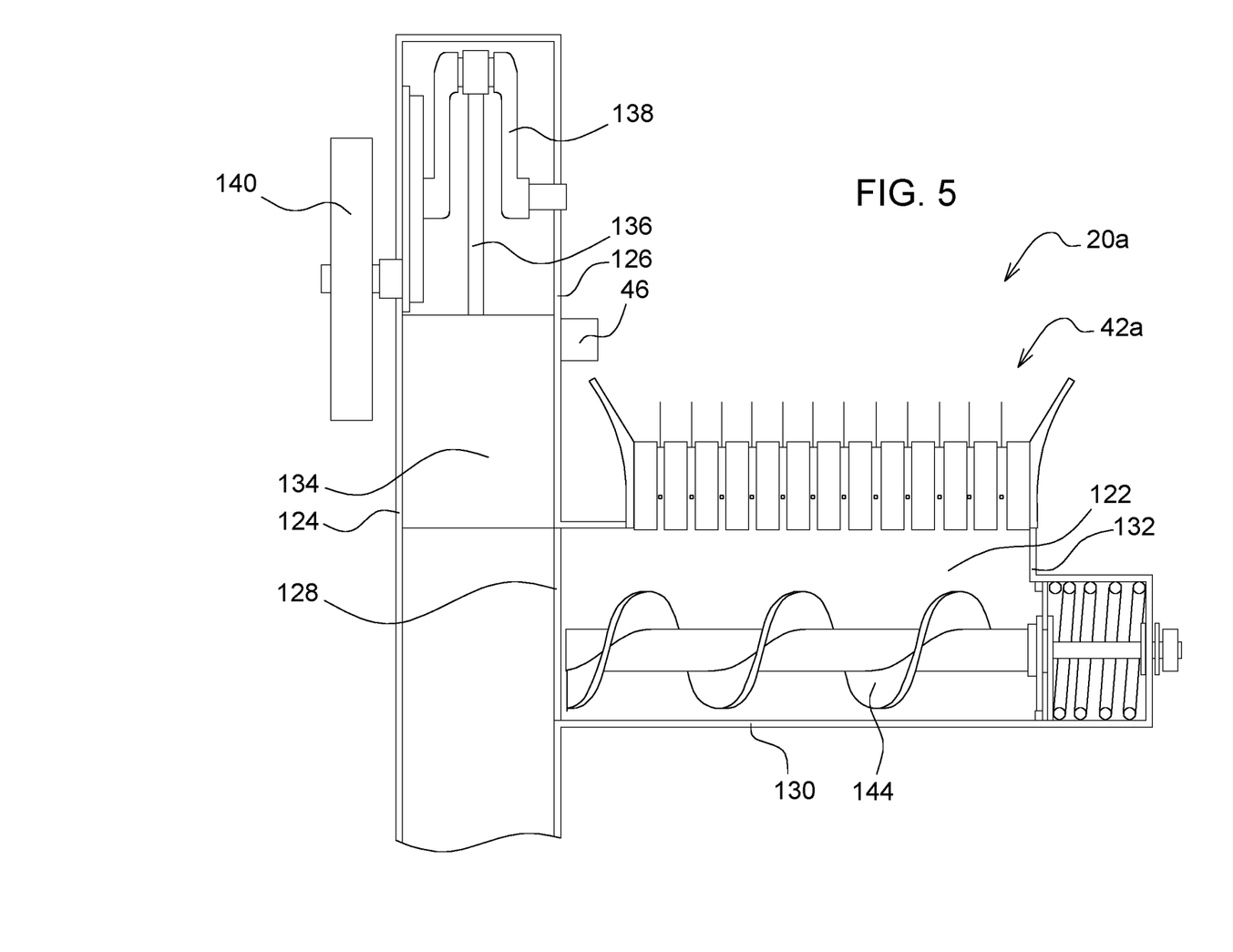
FIG. 5 is a plan view of the baler of FIG. 2.

Depending upon the type of drawn implement 20, the working unit may be of different types. As further explained below, for a mower conditioner such as shown in FIGS. 1 and 3 the working unit 42 may be a cutting head. For a side-drawn baler such as shown in FIGS. 2, 4 and 5 the working unit may include a hay pick up device. However, the invention is by no means limited to implements of these types, but can also be used in other towed implements, e.g., soil conditioning tools, saws, sprayers and the like.

The mower conditioner 20 shown in more detail in FIG. 3, includes an undercarriage or main frame 36, wheels 38, wheel suspensions 92, a spring arrangement 94, adjusting devices 96 and the working unit 42.

The mower-conditioner 20 serves for cutting, processing and depositing stalk crops 37 on the ground 40. While in operation, the mower conditioner 20 is towed over uneven terrain with a relatively high speed and constantly subjected to shocks that, in addition to the flexibility of the wheels 38, need to be absorbed by the spring arrangement 94.

The main frame 36 is essentially constructed in the form of a frame that has the shape of an upside-down "U" with vertical limbs 100 and a horizontal crossbeam 98, in the intermediate space of which the working unit 42 is at least partially accommodated. The main frame 36 carries the working unit 42 in a fashion described in greater detail below, and together with the working unit can be adjusted to different elevations in reference to the ground.

A wheel 38, that is conventionally provided with a pneumatic tire, is connected in the lower region of each limb 100, such that it can be vertically pivoted, namely by means of the wheel suspension 92, which includes a trailing link having its forward end pivotally coupled to the limb 100 and carrying at its rear end a spindle on which the wheel 38 is rotatably mounted. Thus, the main frame 36 is supported on the ground 40 by the wheels 38.

A holder or bracket 102 is situated in the upper region of each limb 100. In addition, a bearing 104 located in a rear region of an upper longitudinally extending arm 106 forms part of a pivotal coupling of the arm 106 to the crossbeam 98. Further, a bearing 108 forms part of a vertical pivotal axis about which a forward section of the tongue 44 is connected for pivoting horizontal relative to a rear section that is fixed to the cross beam 98. Receivers 110 for springs 112 are also provided on each side of the crossbeam 98. An orientation sensor 218 is schematically indicated and is associated with the pivotal connection 108 to detect the angular orientation of the working unit 42 relative to the draft tongue 44.

Each wheel suspension 92 further includes a connection or bracket 114 located at the upper rear portion of the trailing link. Extending between the brackets 102 and 114 is an extensible and retractable cylinder 116 of the adjusting device 96. The cylinder 116, which is constructed in the form of a single-action hydraulic cylinder that is pressurized to effect its extension, can also be considered to form part of the wheel suspension 92. A lower suspension link 118 cooperates with the upper link 106 to form a four-bar linkage and has its rear end coupled to the trailing link by a pivot pin 120, and has its forward end coupled to a lower rear region of the working unit 42.

FIG. 1 schematically illustrates three different positions of the center pivot mower conditioner 20 relative to the tractor 22. In solid lines the center pivot mower conditioner is shown being pulled on the right side of the tractor 22. In dashed lines indicated as 20' the center pivot mower conditioner is shown being pulled on the left side of the tractor 22. In dashed lines indicated as 20" the center pivot mower conditioner is shown being pulled directly behind the tractor 22. The corresponding locations of the draft tongue 44 are similarly indicated as 44' and 44".

A camera 46 is mounted on a camera mount 48. The camera 46 may more generally be referred to as a sensor 46, and the camera mount may be referred to as a sensor mount 48. The sensor 46 may be of other types, in addition to a camera; for example ultrasonic sensors, infrared sensors, laser sensors, and others may be used to detect the crops 37 ahead of the drawn implement 20. The discussion below will primarily refer to the use of a camera, but it will be understood that any of these other types of sensors may be substituted for a camera in an appropriate situation. The sensor 46 may also be referred to as a crop sensor 46. It will also be understood that more than one sensor may be used in association with a single implement.

In the embodiment of the mower conditioner 20 shown in FIGS. 1 and 3 the camera mount 48 may be supported from the draft tongue 44. As best seen in FIG. 1, the camera mount 48 is pivotable about at least one primarily vertical first axis 50. This allows the orientation of a field of view 52 of the camera 46 to be adjusted about the first axis 50 so that the field of view 52 can be oriented in a primarily forward facing direction. Orientation of the field of view 52 is defined as the orientation of a central axis 54 of the field of view 52. For example the central axis 54 of the field of view may be oriented such that the field of view encompasses or is centered on one or both of the edges 37a or 37b of the crop 37 so that the working unit 42 can be best oriented relative to the edge 37a or 37b. This orientation may change dependent upon a change in the heading 30 of the tractor 22.

As used herein if an axis is described as "primarily" vertical, this means that the axis is closer to vertical than it is to horizontal, i.e. the axis is within a range of plus or minus 45 degrees from vertical. If an axis is described as "primarily" horizontal, this means that the axis is closer to horizontal than it is to vertical, i.e. the axis is within a range of plus or minus 45 degrees from horizontal. Similarly, if a direction or orientation is described as "primarily" forward, the direction is within a range of plus or minus 45 degrees from the forward direction 30. Thus when the field of view 52 is described as being oriented in a primarily forward facing direction, this means that a horizontal component of the central axis 54 lies within plus or minus 45 degrees of the forward direction 30 when the forward direction 30 is horizontal.

More preferably the field of view 52 is oriented such that the horizontal component of the central axis 54 is plus or minus thirty degrees from the forward direction 30 when the forward direction 30 is horizontal, and even more preferably the field of view 52 is oriented such that the horizontal component of the central axis 54 is plus or minus ten degrees from the forward direction 30 when the forward direction 30 is horizontal.

Figure 6:
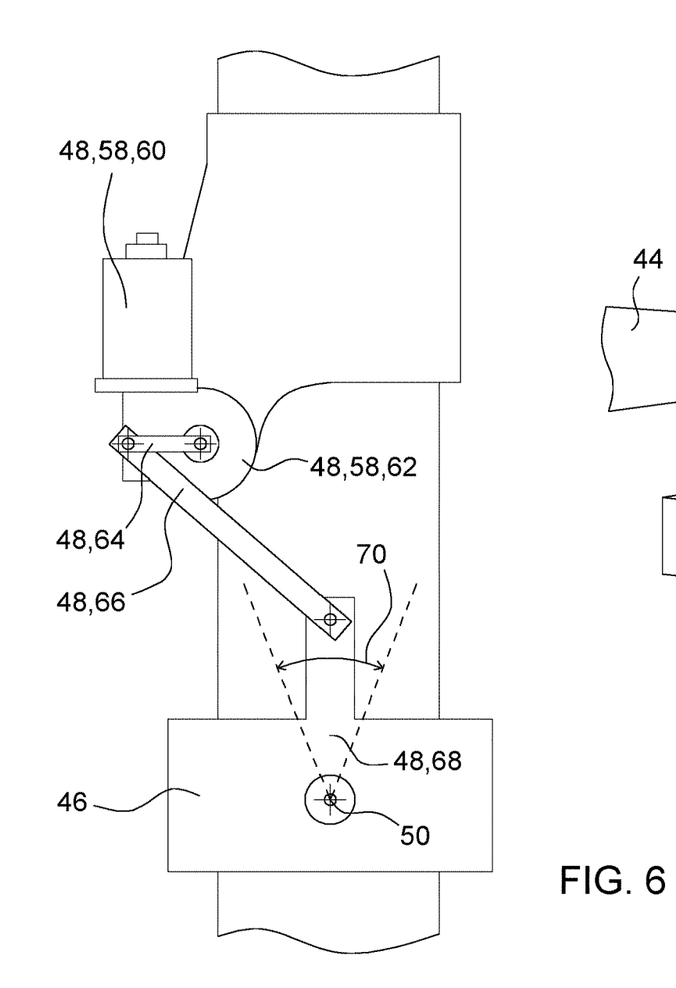
FIG. 6 is a schematic upward looking view of a crank-rocker type of linkage and associated actuator for adjusting the direction of the field of view of the camera, for example as mounted on the underside of the draft tongue of the mower conditioner of FIG. 1.
Figure 7:
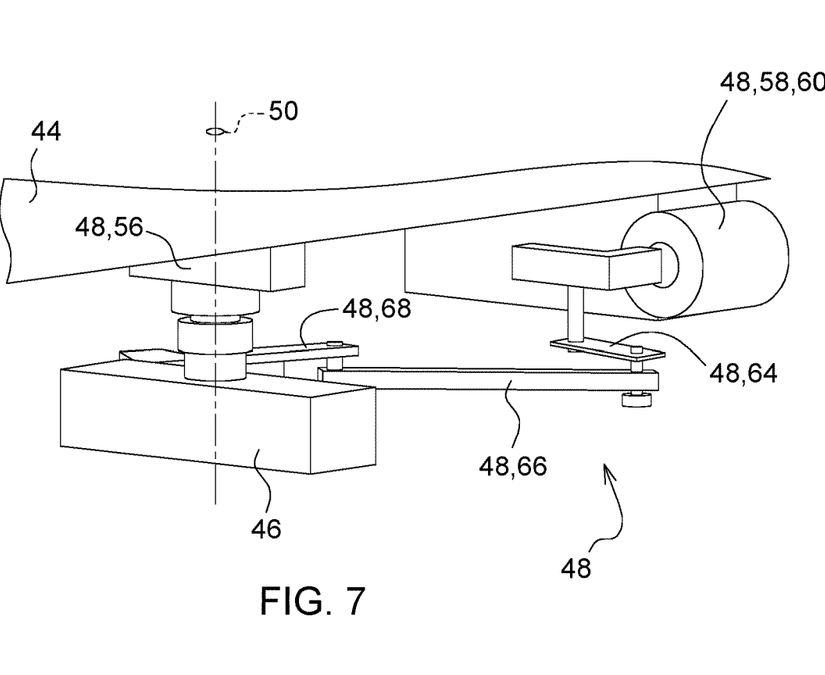
FIG. 7 is a perspective view of the linkage and actuator of FIG. 6 as mounted on the underside of the draft tongue.

FIGS. 6 and 7 show one example of the camera mount 48 in the form of a crank-rocker type four bar linkage mounting the camera 46 on the underside of the draft tongue 44 of the center pivot mower conditioner 20 of FIGS. 1 and 3. The camera mount 48 may include a swivel base 56 attached to the underside of the draft tongue 44. The camera 46 is pivotable on the swivel base 56 about the first axis 50.

An actuator 58 including an electric motor 60 and gear set 62 rotates a crank link 64. The electric motor 60 may be a reversible stepper motor. The crank link 64 reciprocates a connecting link 66 which rocks a rocker link 68 back and forth through a range of motion designated as angle 70. Thus when the draft tongue 44 is located on the right side of the tractor 22 as shown in solid lines in FIG. 1, the camera 46 may be pivoted to the right hand extreme of the range of motion 70, and when the draft tongue 44 is located on the left side of the tractor 22 as shown in dashed lines 44' in FIG. 1, the camera 46 may be pivoted to the left hand extreme of the range of motion 70. When the draft tongue 44 is directly behind the tractor 22 as shown in dashed lines 44" in FIG. 1, the camera 46 may be pivoted to center of the range of motion 70. Also of course the orientation of the camera can be set at any location between the extreme ends of the range of motion 70.

The linkage of camera mount 48 may be described as a four-bar linkage, having an actuator 60 for automated movement of the four-bar linkage to pivot the camera mount 48 and the camera 46 about at least one primarily vertical first axis. It is noted that instead of centering the camera 46 on one of the pivots of the four-bar linkage, the camera 46 may be mounted on one of the links 64, 66, 68 so that the camera rotates or pivots about multiple primarily vertical axes.

Different types of linkages, other than the crank-rocker linkage, may also be used for the camera mount 48, depending upon the range and type of motion which best provides the desired adjustability of orientation of the camera 46.

Figure 8:
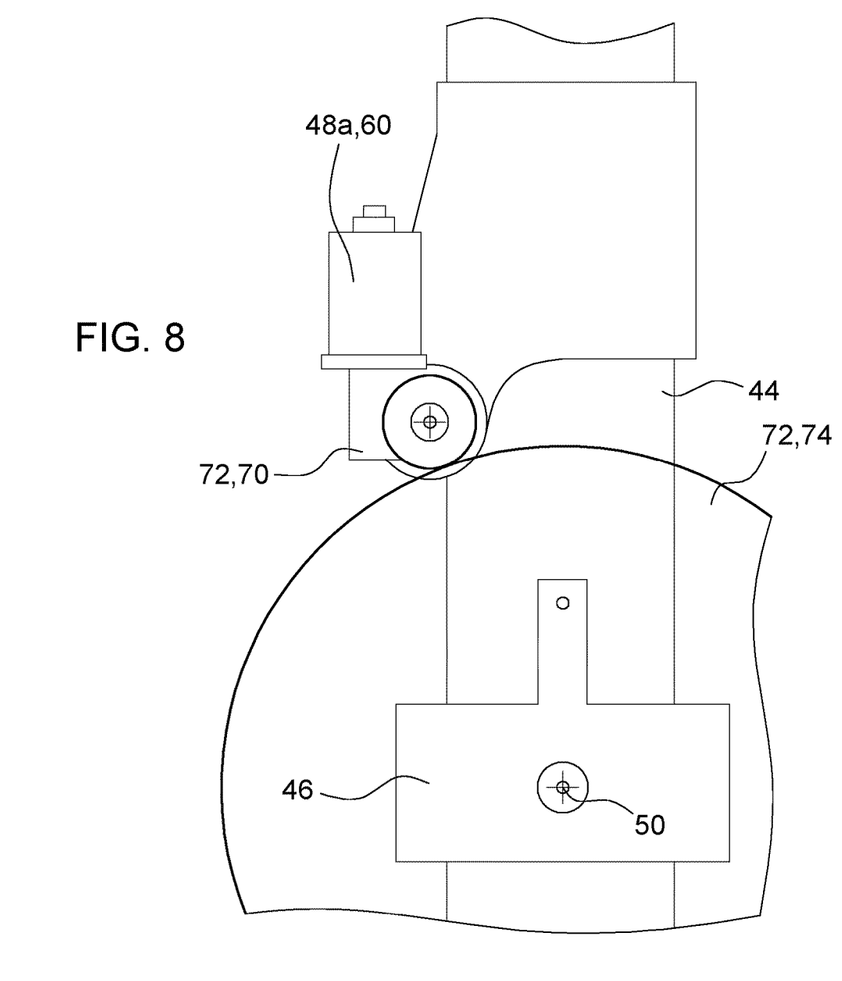
FIG. 8 is a schematic upward looking view similar to FIG. 6, of a gear arrangement and associated actuator for adjusting the direction of the field of view of the camera, for example as mounted on the draft tongue of the mower conditioner of FIG. 1.

Another suitable arrangement for the camera mount is schematically shown in FIG. 8 and designated as 48a. The camera mount 48a of FIG. 8 includes a gear mechanism 72 including a larger gear 74 and a smaller gear 76. The larger gear 74 is rotatably mounted on the draft tongue 44 and has the camera 46 mounted on the larger gear 74 for rotation therewith about the first axis 50. The smaller gear 76 is driven by the electric motor 60 and meshes with the larger gear 74.

Figure 9:
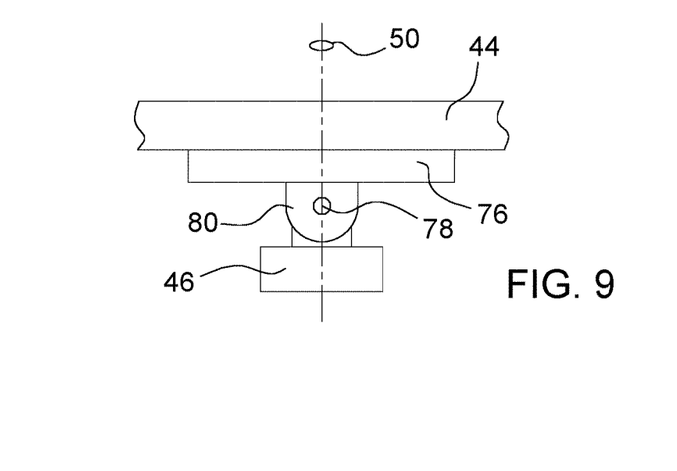
FIG. 9 is an enlarged schematic illustration of the camera mount of FIG. 1 including a second degree of freedom about a horizontal second axis.

Preferably, the camera mount 48 or 48*a* is also configured to provide a second degree of freedom to allow the camera mount and the camera 46 to pivot about at least one primarily horizontally extending second axis 78 to allow the camera 46 to be tilted up and down about the second axis 78. As schematically shown in FIGS. 3 and 9, such an arrangement can be provided, for example, by providing an adjustable horizontally oriented cylindrical pivot joint 80 mounting the camera 46 to the four-bar linkage mechanism or to the gear mechanism 72 described above. Preferably the camera 46 may be tilted such that the central axis 54 of its field of view 52 is either horizontal or downwardly sloped at angle 146 in the forward direction 30 as schematically shown in the side elevation view of FIG. 3.

Figure 10A:
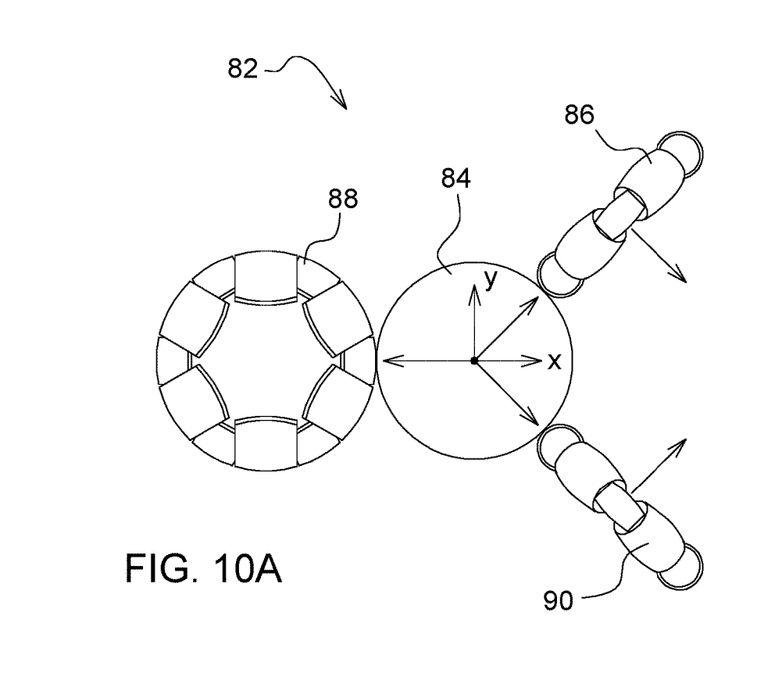
FIG. 10A is a schematic plan view of an omni-directional camera mount providing three degrees of freedom about three mutually orthogonal axes.
Figure 10B:
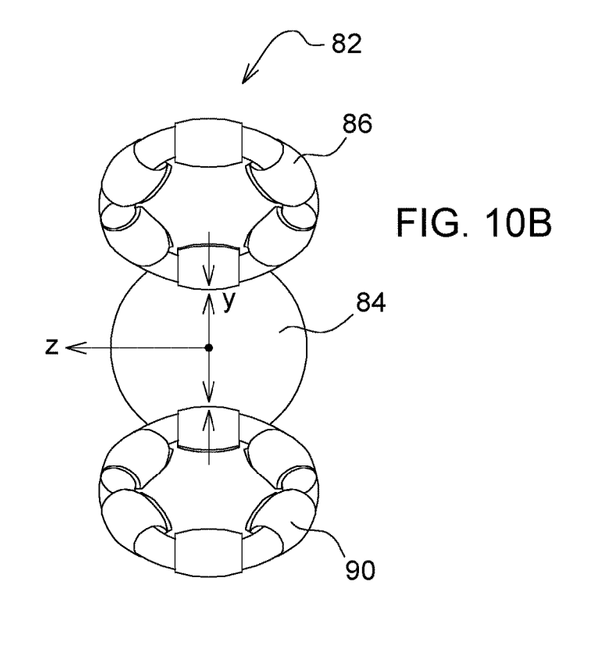
FIG. 10B is a schematic side view of the omni-directional camera mount of FIG. 10A.

Even more preferably, the camera mount may be configured to provide adjustability of the camera orientation about a third axis orthogonal to the first and second axes. This provides a completely omni-directional adjustability of the orientation of the camera. One example of such a omni-directional form of mounting is a spherical-actuator-magnet manipulator (SAMM) such as that described in Wright, "A Spherical-magnet End-effector for Robotic Magnetic Manipulation", 2015 IEEE International Conference on Robotics and Automation (2015). FIGS. 10A and 10B schematically illustrate such a SAMM connection which is generally indicated as 82. FIG. 10A is a plan view schematically showing the spherical magnet 84 and three mutually orthogonally oriented omniwheel rotators 86, 88 and 90. FIG. 10B is a right side view of the device of FIG. 10A. This provides rotation of the spherical magnet 84 about any of the three axes a1, a2 and a3.

It is noted that although the camera mounting system disclosed herein is primarily configured to allow an angular repositioning of the field of view 52, in its broader aspects the present invention also includes translational repositioning of the field of view. This translational repositioning may include up to three degrees of translational repositioning include adjustment of the position of the camera 46 in one or more of the x, y and z directions relative to the draft tongue or other component upon which the camera 46 is mounted.

All of these same camera mount arrangements can be utilized with other types of drawn implements, such as for example the side-drawn baler 20*a* shown in FIGS. 2, 4 and 5.

The side-drawn baler 20*a* may generally be described as including a main frame 36*a* and a plurality of ground engaging units 38*a* for supporting the main frame 36*a* from the ground surface 40. Baler 20*a* further includes a working unit 42*a* supported from the main frame 36*a* and configured to engage crops as the implement 20*a* moves in the forward direction 30 across the ground surface 40. Baler 20*a* further includes a draft tongue 44*a* extending from the main frame 36*a* for attachment to the tractor 22.

The main frame 36*a* carries the working unit or pickup device 42*a* for picking up the windrowed crops 37 and delivering them rearwardly to a deck or floor 122 that leads laterally inwardly to a fore-and-aft extending bale case 124. The bale case 124 has an upright inner or right hand wall 126 in which is formed a feed opening 128 from which the floor 122 extends laterally outwardly. The pickup device 42*a* is delineated at its rear by a transverse rear wall 130 and is further delineated at its outer or right hand end by an outer wall 132. A reciprocating baling plunger 134 is carried in the bale case 124 for operation on alternate compression and retracting strokes, the plunger being conventionally driven by a pitman 136 and crank shaft 138 on which is a flywheel 140. Power for driving the crank shaft 138 is derived from the tractor 20 by the power takeoff 32 which drives a propeller shaft 142 (see FIG. 4) which delivers power to a gear transmission of the baler 20*a*. Located rearwardly behind the crop pickup device 42*a* is an auger 144 for moving picked up crop into the bale case 124.

The camera mounting systems described above may be incorporated in the drawn implements 20, 20*a* to provide an optimum camera perspective to allow the imaging systems associated with the camera 46 to identify uncut, cut, gathered or windrowed crops 37 in order to optimize machine performance during a harvesting or handling operation. Vision is an integral part of "smart" systems that automate machine control. An optical perspective that is too tall has difficulty establishing the height of uncut crop, the stubble height of cut crop, and any color or shading differences between processed and undisturbed crop. An optical perspective that is too short is also distractive as it may be easily concealed by the crop itself or it may be overwhelmed by the glare of light radiating from the sun.

Not only is vertical position strategic, but an optimized longitudinal camera position also can have an impact on machine control and performance. A camera placed relatively close to a working extremity does not require a large magnification for a detailed view of work to be done. Consequently, resulting imaging is more usable as any vibrations resonating through mounting structures are not magnified. Similarly, control is less complex with a feedback mechanism that is close to the work point. Error is reduced as targets are easily identified because they simply are not magnified across lengthy offset distances extrapolated over sometimes several, non-rigid connections.

Furthermore, because many agricultural and commercial machines have mounted implements that may be oriented differently depending on the job to be performed, such as the center pivot mower conditioner 20 described above, adjustability in the orientation of any camera or other sensor relative to the implement provides improved functionality.

The camera mounting systems proposed herein take into consideration many of these factors to provide preferred arrangements for various types of drawn implements.

For a side-drawn mower 20, such as the center pivot mower conditioner described above with reference to FIGS. 1 and 3, an ideal camera elevation clears the highest points of either processed and/or standing material 37 and is relatively close to the working location of the cutting head 42 of the machine. As shown in FIGS. 1 and 3 a preferred position for the camera 46 is location on the draft tongue 44 just in front of and above the cutting head 42, with a viewing angle 146 about the horizontal axis 80 that is relative flat to down, and with the viewing angle 148 about the vertical axis 50 that is primarily in the forward direction 30 of the work to be performed.

For a side-drawn baler, such as shown in FIGS. 2, 4 and 5, a preferred position for the camera 46 is to mount the same on the inner wall 146 of the bale case 124 ahead of the crop pickup 42*a*.

Figure 11:
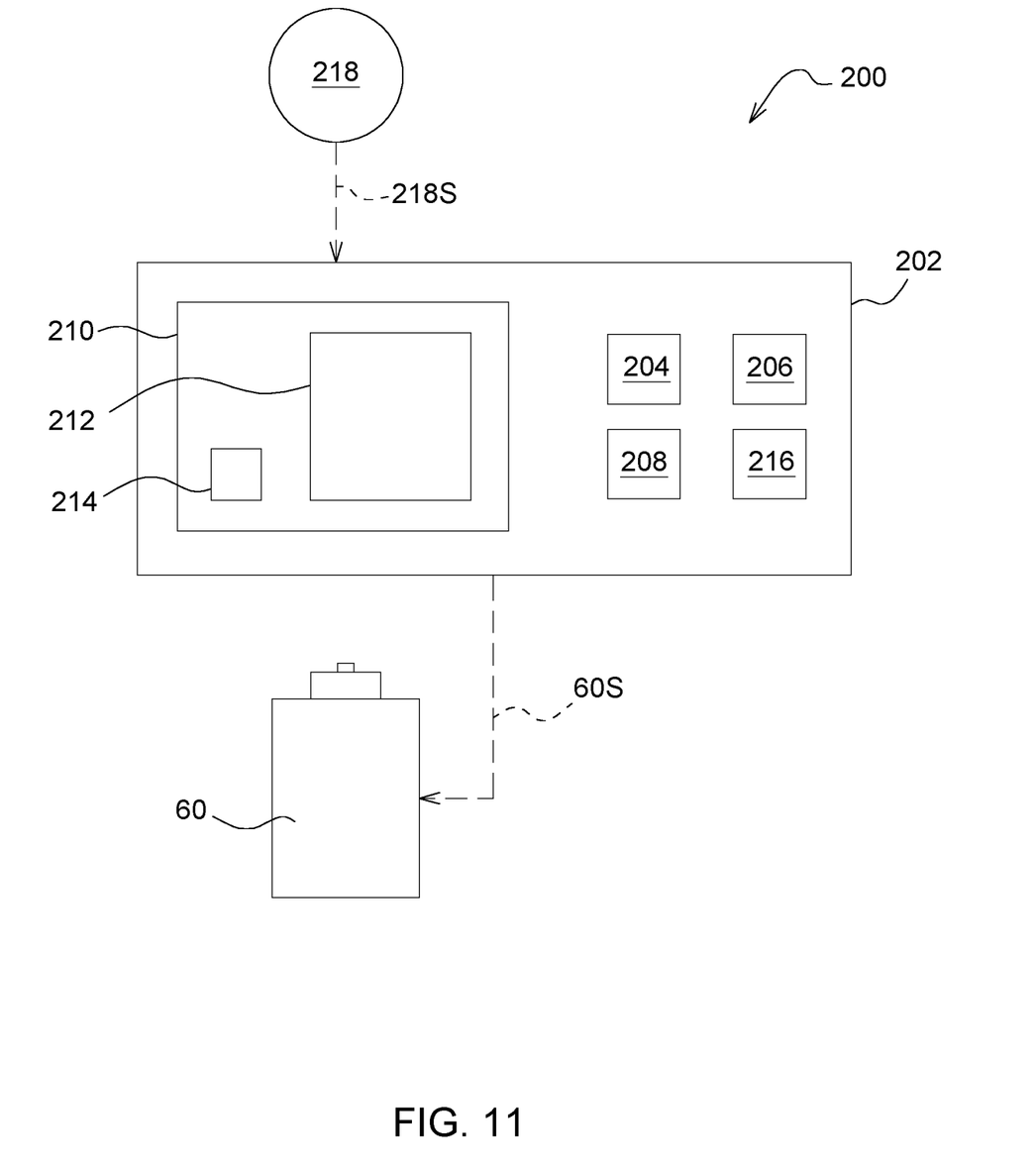
FIG. 11 is a schematic illustration of a control system for repositioning the camera.

Control Systems:

In FIG. 11 a control system 200 is schematically shown. As is explained below, the positioning of the camera 46 can be controlled remotely manually by a human operator located on the tractor 24 and/or the positioning of the camera 46 can be automatically controlled based on various monitored parameters.

The control system 200 includes a controller 202. The controller 202 may be part of the machine control system of the tractor 24, or it may be a separate control module. The controller 202 may be mounted in the operator's cab of the tractor 24. The controller 202 is configured to receive an input such as an orientation 218S signal from the orientation sensor 218. The signals transmitted from the various sensors to the controller 202 are schematically indicated in FIG. 11 by phantom lines connecting the sensors to the controller with an arrowhead indicating the flow of the signal from the sensor to the controller 202.

Similarly, the controller 202 will generate control signals for controlling the operation of the various actuators, which control signals are indicated schematically in FIG. 11 by phantom lines connecting the controller 202 to the various actuators with the arrow indicating the flow of the command signal from the controller 202 to the respective actuator. For example, a control signal 60S is indicated going to the electric motor 60 of actuator 58 which drives the rocker crank linkage of camera mount 48. It will be understood that the control signal 60S from the controller 202 may activate relays and switches (not shown) to direct electrical power to the electric motor 60 to drive the motor in a desired direction at a desired speed. Although the actuator 60 illustrated controls the orientation of the camera 46 only about the vertical axis, it will be understood that two additional actuators can be provided to control the orientation of the camera 46 about two orthogonal horizontal axes.

Controller 202 includes or may be associated with a processor 204, a computer readable medium 206, a data base 208 and an input/output module or control panel 210 having a display 212. An input/output device 214, such as a keyboard, joystick or other user interface, is provided so that the human operator may input instructions to the controller. It is understood that the controller 202 described herein may be a single controller having all of the described functionality, or it may include multiple controllers wherein the described functionality is distributed among the multiple controllers.

Various operations, steps or algorithms as described in connection with the controller 202 can be embodied directly in hardware, in a computer program product 216 such as a software module executed by the processor 204, or in a combination of the two. The computer program product 216 can reside in RAM memory, flash memory, ROM memory, EPROM memory, EEPROM memory, registers, hard disk, a removable disk, or any other form of computer-readable medium 206 known in the art. An exemplary computer-readable medium 206 can be coupled to the processor 204 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/ or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

In a remote manually controlled mode of operation the human operator located on the tractor 24 may observe an image from the camera 46 displayed on the display 212 located in the cab of the tractor 24. The human operator may input command signals via the input output device 214 to direct the reorientation of the camera 46. The input output device 214 of the controller 202 may be described as being configured such that the human operator may manually input orientation instructions to control repositioning of the field of view 52.

In an automated mode of operation, the orientation of the camera 46 may be adjusted in response to one or more monitored parameters. The controller 202 may be configured to generate a command signal 60S to the actuator 60 to move the camera 46 at least in part in response to one or more monitored parameters representative of a position of the field of view 52.

One example is that of the side drawn mower 20, wherein the camera 46 is mounted on the draft tongue 44. In that instance the field of view 52 of the camera 46 may be described as being defined relative to the draft tongue 44. Because the side drawn mower 20 is pivotally connected to the draft tongue it may be desirable to reposition the field of view of the sensor 46 based on an orientation of the side drawn mower 20, and particularly its working unit 42, relative to the draft tongue 44. The controller 202 may monitor the angular orientation of the working unit 42 relative to the draft tongue 44 as detected by the orientation detector 218. The location of the orientation detector 218 is schematically shown in FIGS. 1 and 3 at the pivotal connection 108 of the draft tongue 44 to the main frame 36 of the side drawn mower 20. Orientation detector 218 may be any suitable type of angle sensor. With the camera 46 mounted on the draft tongue 44 the controller 202 may be configured to receive the orientation signal 218S and to generate the command signal 60S to the actuator 60 to reorient the camera 46 at least in part in response to the orientation signal 218S.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims Each disclosed feature or embodiment may be combined with any of the other disclosed features or embodiments.

What is claimed is:

1. A drawn agricultural implement, comprising:
a main frame;
a plurality of ground engaging units supporting the main frame from a ground surface;
a working unit supported from the main frame and configured to engage crops as the implement moves in a forward direction across the ground surface;
a draft tongue extending from the main frame for attachment to a tractor;
at least one sensor having a field of view defined relative to the draft tongue, wherein the sensor is supported by at least one of the draft tongue, the main frame and the working unit, and wherein the sensor is movable relative to the at least one of the draft tongue, the main frame and the working unit to reposition the field of view;
an orientation detector operably associated with the working unit and the draft tongue and configured to generate an orientation signal representative of the orientation of the working unit relative to the draft tongue;

an actuator configured to move the sensor relative to the at least one of the draft tongue, the main frame and the working unit to thereby reposition the field of view; and a controller configured to receive the orientation signal and to generate a command signal to the actuator to move the sensor at least in part in response to the orientation signal;

wherein the sensor is supported such that the field of view relative to the draft tongue may be repositioned based on the orientation of the working unit relative to the draft tongue.

2. The drawn agricultural implement of claim 1, wherein: the sensor is supported on a sensor mount including a four-bar linkage and an actuator for automated movement of the four-bar linkage to pivot the sensor mount about at least one primarily vertical first axis.

3. The drawn agricultural implement of claim 2, wherein: the four-bar linkage is a crank-rocker linkage.

4. The drawn agricultural implement of claim 1, wherein: the sensor is supported on a sensor mount including a gear mechanism and an actuator for automated movement of the gear mechanism to pivot the sensor mount about at least one primarily vertical first axis.

5. The drawn agricultural implement of claim 1, wherein: the sensor is located ahead of and above the working unit.

6. The drawn agricultural implement of claim 1, wherein: the sensor includes a camera.

7. The drawn agricultural implement of claim 1, further comprising:

an actuator configured to move the sensor relative to the at least one of the draft tongue, the main frame and the working unit to thereby reposition the field of view; and a controller configured to generate a command signal to the actuator to move the sensor at least in part in response to one or more monitored parameters representative of a position of the field of view.

8. The drawn agricultural implement of claim 7, further comprising:

an operator input interface configured such that a human operator may manually input orientation instructions to control repositioning of the field of view.

9. A drawn agricultural implement, comprising:

a main frame;

a plurality of ground engaging units supporting the main frame from a ground surface;

a working unit supported from the main frame and configured to engage crops as the implement moves in a forward direction across the ground surface;

a draft tongue extending from the main frame for attachment to a tractor;

at least one sensor having a field of view, wherein the sensor is supported by at least one of the draft tongue, the main frame and the working unit such that the field of view is primarily forward facing, and wherein the sensor is movable relative to the at least one of the draft tongue, the main frame and the working unit to reposition the field of view;

wherein the sensor is pivotable about at least one primarily vertically extending first axis to allow the primarily forward facing field of view of the sensor to be adjusted about the first axis; and wherein the sensor is pivotable about at least one primarily horizontally extending second axis to allow the sensor to be tilted up and down about the second axis.

10. The drawn agricultural implement of claim 9, wherein:

the field of view of the sensor has a central axis;

the central axis of the field of view is oriented such that a horizontal component of the central axis lies within thirty degrees of the forward direction when the forward direction is horizontal; and the sensor is tilted about the second axis such that the central axis is either horizontal or downwardly sloped in the forward direction.

11. The drawn agricultural implement of claim 9, wherein:

the sensor is pivotable about a primarily horizontally extending third axis, the third axis being orthogonal to the first and second axes.

12. A drawn agricultural implement, comprising:

a main frame;

a plurality of ground engaging units supporting the main frame from a ground surface;

a working unit supported from the main frame and configured to engage crops as the implement moves in a forward direction across the ground surface;

a draft tongue extending from the main frame for attachment to a tractor;

at least one sensor having a field of view, wherein the sensor is supported by at least one of the draft tongue, the main frame and the working unit, and wherein the sensor is movable relative to the at least one of the draft tongue, the main frame and the working unit to reposition the field of view;

wherein the implement is a center-pivot implement configured such that the draft tongue can be selectively pivoted to either a right side or a left side of the tractor; and wherein the sensor is supported so as to allow a primarily forward orientation of the field of view of the sensor regardless of whether the draft tongue is pivoted to the right side or the left side of the tractor.

13. A The drawn agricultural implement, comprising:

a main frame;

a plurality of ground engaging units supporting the main frame from a ground surface;

a working unit supported from the main frame and configured to engage crops as the implement moves in a forward direction across the ground surface;

a draft tongue extending from the main frame for attachment to a tractor;

at least one sensor having a field of view, wherein the sensor is supported by at least one of the draft tongue, the main frame and the working unit, and wherein the sensor is movable relative to the at least one of the draft tongue, the main frame and the working unit to reposition the field of view;

wherein the field of view of the sensor has a central axis; and wherein the central axis of the field of view is oriented such that a horizontal component of the central axis lies within thirty degrees of the forward direction when the forward direction is horizontal.

14. A sidedrawn mower, comprising:

a main frame;

a plurality of ground engaging units supporting the main frame from a ground surface;

a cutting head supported from the main frame and configured to engage crops as the sidedrawn mower moves in a forward direction across the ground surface;

a draft tongue extending from the main frame for attachment to a tractor; and at least one sensor having a field of view, wherein the sensor is supported from the draft tongue ahead of the cutting head, and wherein the sensor is movable relative to the draft tongue to reposition the field of view.

15. A sidedrawn baler, comprising:

a main frame;

a plurality of ground engaging units supporting the main frame from a ground surface;

a bale case extending generally from front to rear, the bale case being supported from the main frame;

a crop pickup extending laterally relative to the bale case, the crop pickup being supported from the main frame and configured to engage crops as the sidedrawn baler moves in a forward direction across the ground surface;

an auger located behind the crop pickup for moving picked up crop into the bale case; and a draft tongue extending from the main frame for attachment to a tractor;

at least one sensor having a field of view, wherein the sensor is supported from the bale case ahead of the crop pickup, and wherein the sensor is movable relative to the bale case to reposition the field of view.

* * * * *